(12) United States Patent
Vengerov (10) Patent No.: US 7,665,092 B1
(45) Date of Patent: Feb. 16, 2010

(54) METHOD AND APPARATUS FOR DISTRIBUTED STATE-BASED LOAD BALANCING BETWEEN TASK QUEUES

(75) Inventor: David Vengerov, Sunnyvale, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 1153 days.

(21) Appl. No.: 11/013,498

(22) Filed: Dec. 15, 2004

(51) Int. Cl.
*G06F 9/46* (2006.01)
(52) U.S. Cl. ...................................... 718/105
(58) Field of Classification Search ................. 708/104, 708/105; 709/201; 712/10
See application file for complete search history.

(56) References Cited

U.S. PATENT DOCUMENTS

| | | | | |
|---|---|---|---|---|
| 6,128,642 A | * | 10/2000 | Doraswamy et al. | 709/201 |
| 6,292,822 B1 | * | 9/2001 | Hardwick | 718/105 |
| 7,065,766 B2 | * | 6/2006 | Brenner | 718/103 |
| 7,430,742 B2 | * | 9/2008 | Beaumont | 718/105 |

* cited by examiner

*Primary Examiner*—Meng-Ai An
*Assistant Examiner*—Gregory A Kessler
(74) *Attorney, Agent, or Firm*—Park, Vaughan & Fleming LLP; Shun Yao (57) ABSTRACT

One embodiment of the present invention provides a system that performs load balancing between task queues in a multiprocessor system. During operation, the system conditionally requests load information from a number of neighboring CPUs in a neighborhood of a requesting CPU. In response to the request, the system receives load information from one or more neighboring CPUs. Next, the system conditionally requests one or more neighboring CPUs to transfer tasks to the requesting CPU based on the received load information, thereby balancing load between the CPUs in the neighborhood.

14 Claims, 5 Drawing Sheets

METHOD AND APPARATUS FOR DISTRIBUTED STATE-BASED LOAD BALANCING BETWEEN TASK QUEUES

GOVERNMENT LICENSE RIGHTS

This invention was made with United States Government support under Contract No. NBCH020055 awarded by the Defense Advanced Research Projects Administration. The United States Government has certain rights in the invention.

BACKGROUND

The present invention relates to the process of load balancing in a multiprocessor system.

A multiprocessor system includes a number of central processing units (CPUs) and memories, which typically communicate through a communication network. For example, in an exemplary system, nodes containing CPUs and memories are organized in a two-dimensional grid, wherein each node can communicate with neighboring nodes (in north, east, south or west directions). Furthermore, CPUs can process tasks simultaneously, thereby increasing the overall performance of the computer system.

To fully utilize the processing power of a multiprocessor system, it is important to balance the load between these CPUs. If the load in a multiprocessor system is unbalanced, some CPUs may have a large number of tasks to process while others are idle. In contrast, in a load-balanced system, as many CPUs as possible are kept busy, which allows the system to achieve a near-optimal performance.

Unfortunately, a system may have unbalanced load even when tasks are assigned to the CPUs at the same rate. This is because a task can split into multiple tasks, which are placed at the end of the queue for the CPU working on the task. Hence, even if at one point of time all the queues are of the same length, their lengths may grow uneven as time progresses.

One approach to the load-balancing problem is to use a centralized load balancer which monitors the load of all the queues and assigns tasks accordingly. However, such a centralized entity presents a single point of failure, which is undesirable for a large-scale system requiring high reliability.

Hence, what is needed is a method and an apparatus that performs load balancing without the above mentioned problems.

SUMMARY

One embodiment of the present invention provides a system that performs load balancing between task queues in a multiprocessor system. During operation, the system conditionally requests load information from a number of neighboring CPUs in a neighborhood of a requesting CPU. In response to the request, the system receives load information from one or more neighboring CPUs. Next, the system conditionally requests one or more neighboring CPUs to transfer tasks to the requesting CPU based on the received load information, thereby balancing load between the CPUs in the neighborhood.

In a variation on this embodiment, the size of the neighborhood is defined in terms of number of hops separating CPUs.

In a variation on this embodiment, conditionally requesting load information from the neighboring CPUs involves determining whether the load of the requesting CPU is below a threshold. If so, the system requests load information from the neighboring CPUs In a further variation, the threshold is determined based on a delay involved in requesting and receiving load information from a neighboring CPU and a delay involved in requesting and receiving tasks from a neighboring CPU.

In a variation on this embodiment, conditionally requesting one or more neighboring CPUs to transfer tasks to the requesting CPU involves calculating a neighborhood mean load based on received load information. If the load on the requesting CPU is below the neighborhood mean load, the system requests one or more neighboring CPUs to transfer tasks to the requesting CPU.

In a further variation, the system determines the total number of tasks which are to be requested from the neighboring CPUs based on the neighborhood mean load and the load on the requesting CPU.

In a further variation, determining the total number of tasks which are to be requested from the neighboring CPUs involves selecting the larger of: the amount by which the neighborhood mean load is larger than the load on the requesting CPU, and a minimum number of tasks which can be transferred between CPUs.

In a further variation, the system determines the number of tasks which are to be requested from a neighboring CPU, so that after the transfer, the load on the requested neighboring CPU is not below the neighborhood mean load.

In a further variation, determining the number of tasks which are to be requested from a neighboring CPU involves ranking the neighboring CPUs in decreasing order with respect to their load. The system then determines the number of tasks which are to be requested from each neighboring CPU, starting from the highest-loaded CPU, until the total number of tasks which are to be requested from the neighboring CPUs is satisfied.

One embodiment of the present invention provides a system that performs load balancing between task queues in a multiprocessor system. During operation, the system receives a request to transfer a number of tasks to a requesting CPU. The system then determines whether the load on the requested CPU will be higher than or equal to the load on the requesting CPU if the number of tasks are transferred. If so, the system transfers the number of tasks to the requesting CPU.

In a variation on this embodiment, if the load on the requested CPU will be below the load on the requesting CPU if the number of tasks are transferred, the system reduces the number of the tasks which are to be transferred so that the load on the requested CPU will be higher than or equal to the load on the requesting CPU when the transfer occurs. If the reduced number of tasks is greater than or equal to a minimum number of tasks which can be transferred between CPUs, the system transfers the reduced number of tasks to the requesting CPU.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), memories, FPGAs (field programmable gate arrays), and ASICs (application specific integrated circuits).

Multiprocessor System

Figure 1:
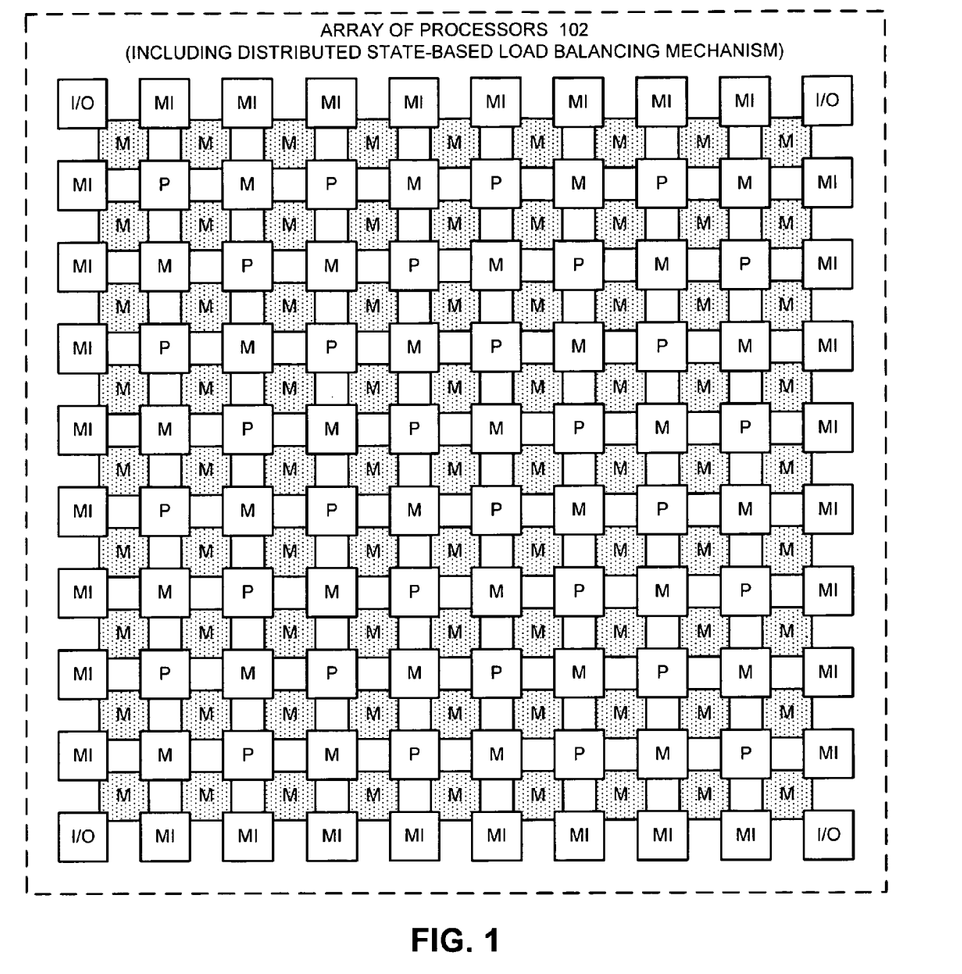
FIG. 1 illustrates a multiprocessor system which is organized as a grid in accordance with an embodiment of the present invention.

FIG. 1 illustrates a multiprocessor system which includes an array of nodes 102 in accordance with an embodiment of the present invention. Each node in array 102 can contain a CPU and/or a memory.

For example, in the embodiment of the present invention illustrated in FIG. 1, the array of computing nodes 102 is comprised of a 19-by-19 grid of nodes, with 9 even-numbered rows containing only memory chips (9 in each row) and the 10 odd-numbered rows, which contain memory chips, CPUs or interface chips. Note that chips on the edge of the grid labeled MI support interface functions, while chips on the corners of the grid labeled I/O support I/O functions. In the embodiment of the present invention illustrated in FIG. 1, the array contains 32 CPUs and 113 memory chips.

For purposes of the present invention, the actual layout of the multiprocessor system is not important, it does not have to be a regular grid. In general, any kind of topology is acceptable, as long as distances between CPUs and memory chips, e.g. in terms of the number of hops, can be defined.

Distributed Load Balancing with State-Based Policy

A centralized load-balancing solution presents a single point of failure, which is undesirable for a large-scale system requiring high reliability. The present invention provides a distributed load-balancing technique employing a state-based policy. A state-based policy specifies the action a CPU can take for each observed state of the system. It can also account for a greater variety of situations than a traditional threshold-based policy does, and can hence specify more specific and effective actions.

In one embodiment of the present invention, each CPU performs load balancing simultaneously with neighboring CPUs. (Note that the neighborhood size can be arbitrarily defined in terms of the number of hops separating CPUs.) A CPU performing load balancing observes the current load distribution in its neighborhood and computes the optimal number of tasks it can receive from its neighbors. In addition, the CPU computes how many tasks each neighbor may contribute based on the latency involved in load transfers.

One aspect of the present invention is to allow each underloaded CPU to request from its neighbors just enough tasks to increase its load up to the mean load in the neighborhood. If a neighborhood is isolated, then after iterating through all the CPUs in the neighborhood, their loads will be equalized (assuming negligible transfer delays). In the case of a system involving a large number of CPUs, one can define a number of overlapping n-hop neighborhoods, each centered at a requesting CPU.

One embodiment of the present invention uses the following steps which comprise a state-based load balancing process:

1. Set a request threshold (RequestThreshold) for a requesting CPU, wherein the CPU initiates a load-balancing process if its load falls below the request threshold. The request threshold is set as:

RequestThreshold=(ERXLR+ELBOR)×Rate; wherein ERXLR is the estimated time for a CPU to inquire about the load of a neighboring CPU and to receive a response; wherein ELBOR is the estimated time for a CPU to request a certain amount of load from a neighboring CPU and to received the requested load; and wherein Rate is the rate at which a CPU processes its tasks.

2. If the load of a CPU i drops below RequestThreshold, CPU i sends a message to its neighbors asking about their load. Note that load can be measured in terms of number of tasks.

3. When a certain fraction of neighboring CPUs reply (the default fraction can be set at 1, but a smaller fraction can be used), or when a certain amount of time has passed (the default time is ELBOR, but a different time can be used), CPU i considers the replies it has received so far and decides whether to request load from its neighboring CPUs.

First, CPU i checks to ensure that its load is below the average load of those CPUs that replied. Then, it checks whether the difference between its load and the load of the highest-loaded neighbor is large enough to perform a load transfer. Ideally, if s units of load are transferred from CPU j to CPU i (when the load is received after the ERXLR units of time), CPU j still has at least as much load as CPU i does. Otherwise, the load transfer will defeat the purpose of allowing the requesting CPU to bring its load only up to the mean load in the neighborhood, and may create undesirable oscillation. This condition can be expressed as:

$$\text{Load}(CPU\ j) - ERXLR \times \text{Rate}(j) - s \geq \max(\text{Load}(CPU\ i) - ERXLR \times \text{Rate}(i), 0) + s \quad (1)$$

wherein Rate(j) is the rate at which CPU j processes its load. For simplicity, Rate(j) is assumed to be 1 for all j. Further, let MinTransfer denote the minimum number of load units that can be transferred (the default value of 1 can be used). Then, CPU i may proceed with the calculated amount of transfer load only if $$\text{MaxLoad}-\text{ERXLR}\times 1-\text{MinTransfer} \geq \max(\text{Load}(\text{CPU } i)-\text{ERXLR}\times 1, 0)+\text{MinTransfer} \quad (2)$$

wherein MaxLoad denotes the load of the highest-loaded neighboring CPU.

4. Compute mean load in the neighborhood, LocalMean. Then, compute the total number of load units the requesting CPU i is to receive (denoted as ToGet): ToGet=max(LocalMean−Load(CPU i), MinTransfer).

5. Let L(j) be the load of neighbor j. Sort all neighbors in decreasing order according to their load, so that neighbor 1 has the highest load, etc. Let y(j) be the number of tasks to be requested from neighbor j. Compute y(j) by having each neighbor j, starting from the highest-loaded one, contribute at most L(j)−LocalMean units of load until ToGet units are obtained. For example, if CPU 1 and CPU 2 have 10 units each and the load on the requesting CPU is 1, then LocalMean=(10+10+1)/3=7, ToGet=6, and y(1)=3, y(2)=3. As a result, the load becomes equalized at 7 units for each CPU after a single application of the state-based load balancing policy.

6. Send a request for y(j) units of load to each neighboring CPU j simultaneously and inform it about the current value of Load(CPU i).

7. When a neighboring CPU j receives a request to transfer some load, it checks whether inequality (1) is satisfied with s=y(j). If so, CPU j can contribute y(j) units of load to CPU i. Otherwise, y(j) is reduced until inequality (1) is satisfied, assuming y(j) remains larger than MinTransfer. That is, if d=max(Load(CPU i)−ERXLR×1, 0)+ERXLR×1+2×y(j)−Load(CPU j)>0, then y(j)=y(j)−0.5×d. If y(j)<MinTransfer, then no transfer takes place; otherwise, CPU j sends y(j) units of load to the requesting CPU i.

The above process is presented in terms of messages passed between CPUs. However, any communication/transfer technique, including the shared memory model, can be used. Note that the process performs well even under the assumption that load can be transferred instantaneously (ERXLR=0).

Figure 2:
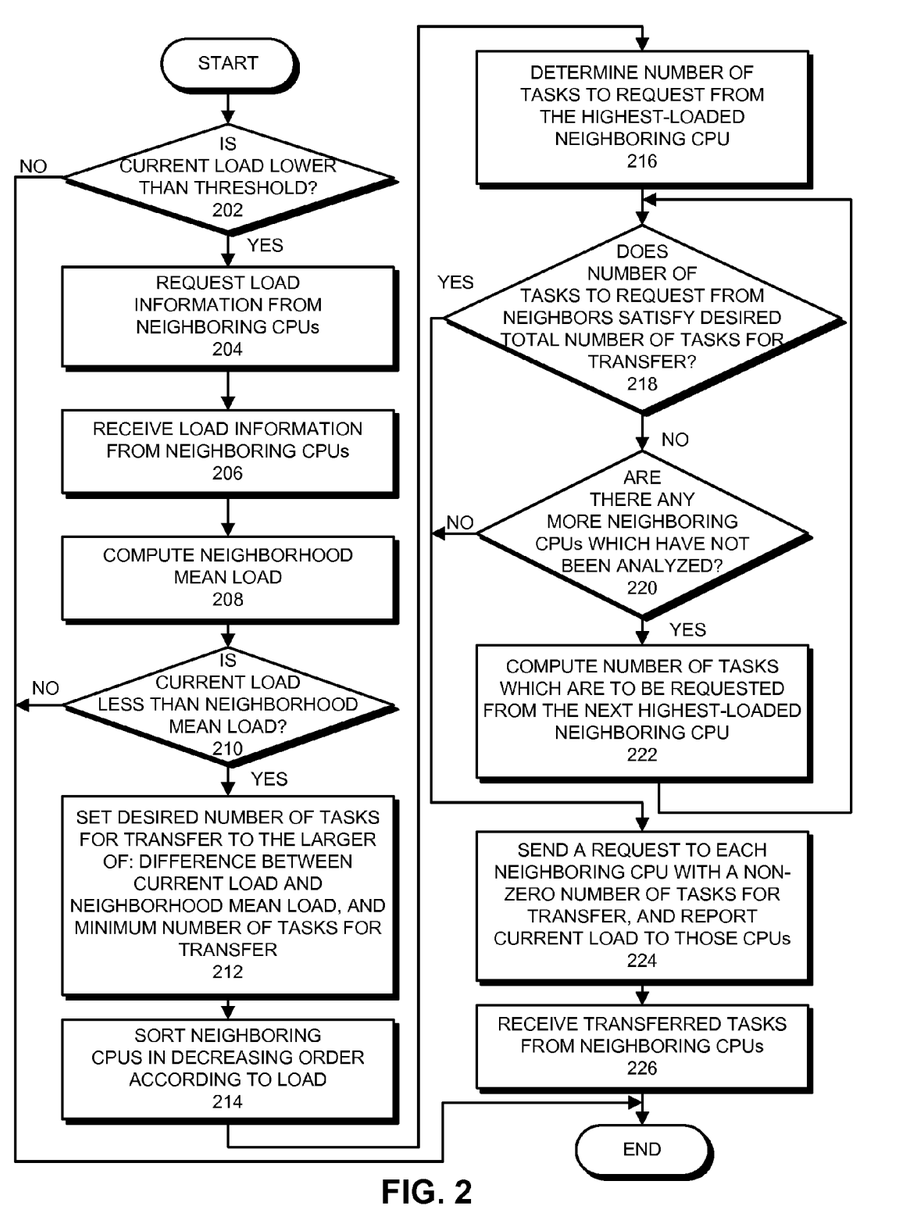
FIG. 2 presents a flow chart illustrating how a CPU obtains state information from its neighbors and requests tasks from neighboring CPUs in accordance with an embodiment of the present invention.

FIG. 2 presents a flow chart illustrating how a CPU obtains state information from its neighbors and requests tasks from neighboring CPUs in accordance with an embodiment of the present invention. During operation, the system starts by determining whether its current load is lower than a threshold (step 202). If the load is not below threshold, the system exits. Otherwise, the system requests load information from its neighboring CPUs (step 204). As a result of its request, the system receives load information from the neighboring CPUs (step 206). The system then computes the corresponding neighborhood mean load (step 208).

Next, the system determines whether the current load is less than the neighborhood mean load (step 210). If its current load is not below the neighborhood mean load, the system exits. Otherwise, the system sets the desired number of tasks for transfer to the larger of the difference between the system's current load and the neighborhood mean load, and the minimum number of tasks for transfer (step 212). The system subsequently sorts the neighboring CPUs in decreasing order with regard to their respective load (step 214). Next, the system determines the number of tasks to request from the highest-loaded neighbor (step 216).

After computing the number of tasks to request from the highest-loaded neighboring CPU, the system determines whether the number of tasks to request from the neighboring CPUs satisfies the desired total number of tasks for transfer (step 218). If so, the system sends a request to each neighboring CPU with a non-zero number of tasks for transfer and reports the system's current load to those CPUs (step 224). The system subsequently receives transferred tasks from the neighboring CPUs (step 226) and exits.

If the number of tasks to request from the neighboring CPUs does not satisfy the desired total number of tasks for transfer, the system further determines whether there are any more neighboring CPUs which have not been analyzed (step 220). If so, the system computes the number of tasks which are to be requested from the next highest-loaded neighboring CPU (step 222). The system then determines whether the number of tasks to request from the neighboring CPUs satisfies the desired total number of tasks for transfer (step 218). If every neighboring CPU is analyzed, the system sends a request to each neighboring CPU with a non-zero number of tasks for transfer and reports the system's current load to those CPUs (step 224). The system subsequently receives transferred tasks from the requested neighboring CPUs (step 226) and exits.

Figure 3:
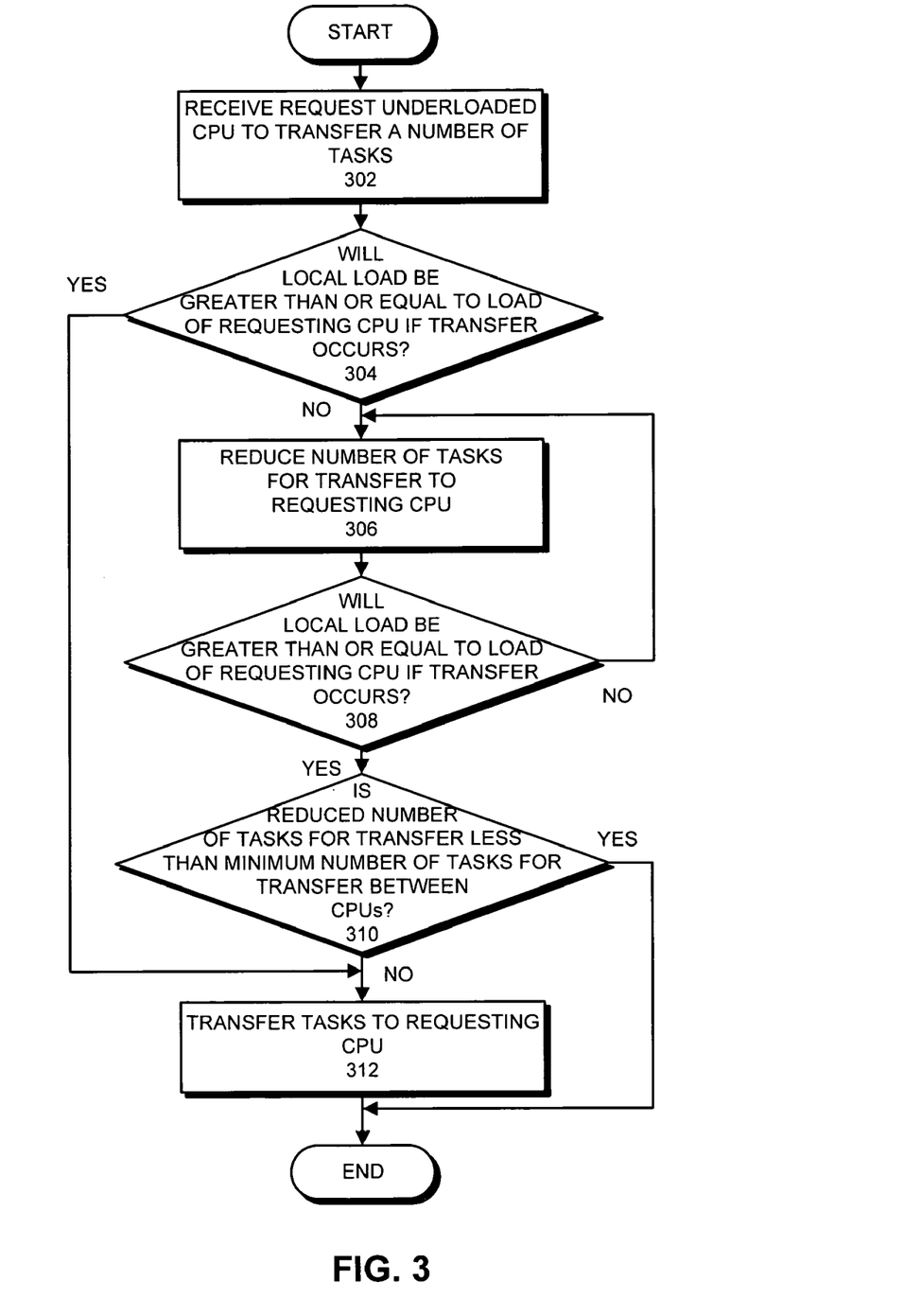
FIG. 3 presents a flow chart illustrating how a CPU responds to a request to transfer tasks in accordance with an embodiment of the present invention.

FIG. 3 presents a flow chart illustrating how a CPU responds to a request to transfer tasks in accordance with an embodiment of the present invention. During operation, the system starts by receiving a request from an under-loaded CPU to transfer a number of tasks thereto (step 302). The system then determines whether the local load will be greater than or equal to the load of the requesting CPU if the transfer occurs (step 304). If so, the system transfers the requested number of tasks to the requesting CPU (step 312) and exits. Otherwise, the system reduces the number of tasks for transfer to the requesting CPU (step 306).

The system subsequently determines whether the local load will be greater than or equal to the load of the requesting CPU if the transfer occurs (step 308). If not, the system further reduces the number of tasks for transfer to the requesting CPU (step 306). Otherwise, the system determines whether the reduced number of tasks for transfer is less than a minimum number of tasks for transfer between CPUs (step 310) (note that, as shown in step 3 in section "Distributed Load Balancing with State-based Policy," the minimum number of tasks for transfer between CPUs can be externally defined to ensure efficient utilization of communication bandwidth between CPUs). If not, the system transfers the reduced number of tasks to the requesting CPU (step 312). Otherwise, the system exits without transferring any tasks to the requesting CPU.

EXPERIMENTAL RESULTS

Figure 4:
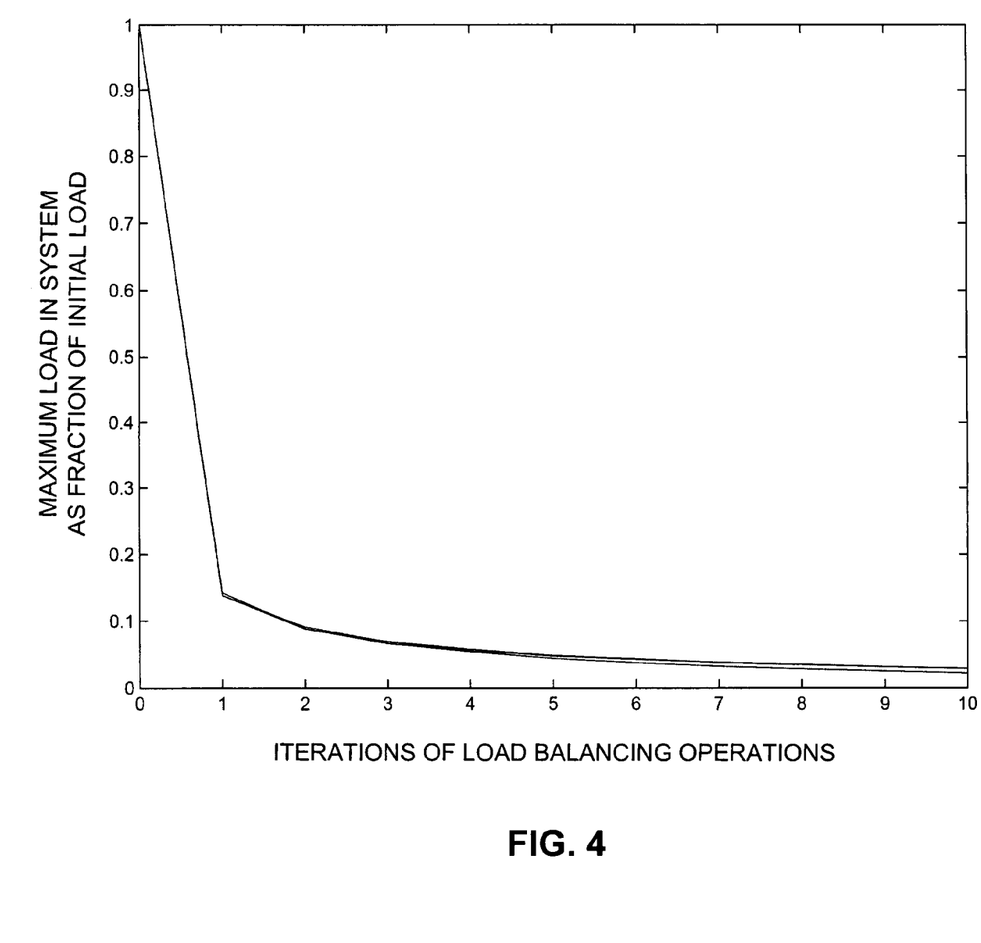
FIG. 4 presents the results of an experimental study of a 31×31 CPU grid employing a distributed state-based load balancing scheme in accordance with an embodiment of the present invention.

FIG. 4 presents the results of an experimental study of a 31×31 CPU grid employing a distributed state-based load balancing scheme in accordance with an embodiment of the present invention. This experimental study evaluates the speed with which the load can be balanced in a 31-by-31 square grid of CPUs (961 in total). In this example, the central CPU receives a certain amount of load initially.

FIG. 4 shows the maximum load in the system (in terms of a fraction of the initial load on the central CPU) as a function of the number of "full sweeps" conducted in the system. A full sweep includes four sweeps in each direction: east, west, south, and north. During an east sweep, each CPU executes the load balancing procedure. The procedure is executed through both rows and columns of the grid in increasing order. During a west sweep, the procedure is executed through rows in increasing order and through columns in decreasing order. During a south sweep, the procedure is executed through columns in decreasing order and through rows in increasing order. During a north sweep, the procedure is executed through columns in increasing order and through rows in decreasing order.

The three curves in FIG. 4 correspond to the initial load being 1000, 10000, and 100000 units. As shown in FIG. 4, the three curves are almost indistinguishable. This demonstrates the robustness of the distributed load balancing policy.

While the fast drop of the maximum load in FIG. 4 is encouraging, the initial condition in this example does not reflect that of a realistic system. In a realistic system, every CPU can receive some initial load. Correspondingly, one can expect the load distribution to be symmetric around the mean load in the system. A simple example of such a load distribution is the "triangular" load shown in FIG. 5.

Figure 5:
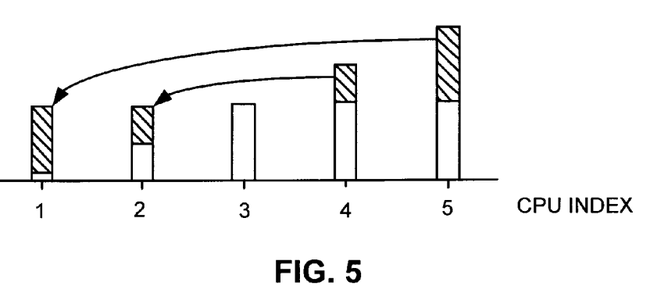
FIG. 5 illustrates an exemplary "triangular" load distribution among five CPUs.

FIG. 5 illustrates an exemplary "triangular" load distribution among five CPUs. As a benchmark for evaluating the performance of the distributed load balancing policy on symmetric load distributions, consider the following "ideal" case of a centralized omniscient load balancing scheme which is applied to the five-CPU example in FIG. 5.

A centralized entity can monitor the load on each CPU. It can take the excess load from the overloaded CPUs, and transfer it to the under-loaded CPUs. If the initial load is randomly distributed around a given mean, then the expected performance speed-up due to this centralized load balancing scheme is 50%. This can be achieved when each overloaded CPU is paired with a CPU that is under-loaded exactly by the same amount, and when some CPU has zero load. That is, the maximum-load curves such as those shown in FIG. 4 would have a horizontal asymptote at 0.5.

Figure 6:
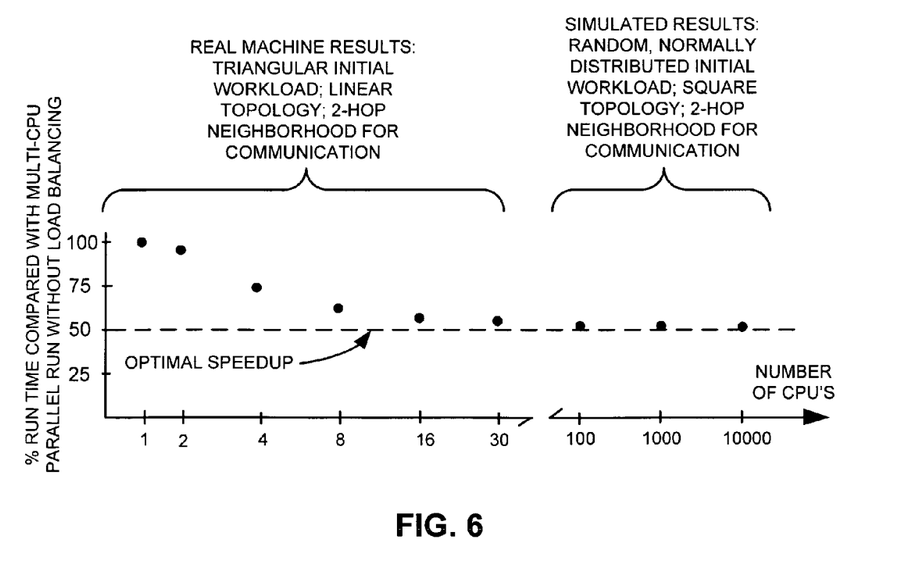
FIG. 6 presents the results of experimental studies for a simulated computing environment with a large number of CPUs employing a distributed state-based load balancing scheme in accordance with an embodiment of the present invention.

FIG. 6 presents the results of experimental studies for a simulated computing environment with a large number of CPUs employing a distributed state-based load balancing scheme in accordance with an embodiment of the present invention. The second set of experiments test the distributed load balancing scheme on an SUN E10K server using a real interval-arithmetic problem. The load transfer time is evaluated to be two orders of magnitude smaller than the time required to process a unit of load, thereby producing a minimal impact on the performance of the load balancing scheme. The initial load has a triangular shape, where the load of $CPU_k$=k. The CPUs are ordered in a ring and each CPU is allowed to request load only from the two neighbors on its left and from the two neighbors on its right. A unit of load may sometimes split into two or more units while being processed. The performance results are presented in the left section of FIG. 6, where the number of CPUs allocated to the whole interval problem varied between 1 and 30.

The third set of experiments verifies the scalability of the distributed load balancing scheme by testing it in a simulated environment with a much larger number of CPUs. The load transfer time is first set to zero in order to make the results comparable with those from the E10K server. The initial load for each CPU is randomly chosen based on a Gaussian distribution with a mean of 1000 and a standard deviation of 10. The load of every CPU is subsequently shifted down so that the least-loaded CPU has 1 unit of load. The CPUs are arranged in a 2-D square grid, and a 2-hop neighborhood is used for communication. The performance results are presented in the right section of FIG. 6.

As can be seen in FIG. 6, performance of the distributed load balancing scheme improves with an increasing number of CPUs, asymptotically reaching the optimal performance. This is because the excess load from overloaded CPUs can propagate further until it finds enough of under-loaded CPUs to absorb it completely. The average number of load transfers per processor is evaluated to be 1 in the second set of experiments, regardless of the number of CPUs involved. Therefore, the stress on communication bandwidth remains constant, which is a very desirable property for a distributed load balancing scheme.

The fourth set of experiments evaluates the sensitivity of the distributed load balancing scheme to a given load transfer latency between CPUs. As the transfer latency becomes 10 times larger than the time required to process a unit of load, and as the initial load of all the CPUs is increased to twice the transfer latency in order to allow for some load transfers to take place before the load of the least-loaded CPU reaches zero, the distributed load balancing scheme still demonstrates a performance improvement of 50%.

The final set of experiments is set in an even more realistic scenario where a unit of load may split with some probability into multiple units while being processed. As expected, this allows the distributed load balancing scheme to improve performance by more than 50%, because a greater load misbalance creates more opportunities for load balancing.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for balancing load between task queues in a multiprocessor system, the method comprising:
    conditionally requesting load information from a number of neighboring CPUs in a neighborhood of a requesting CPU;
    in response to the request, receiving load information from one or more neighboring CPUs;
    calculating a neighborhood mean load based on the received load information;
    if a load on the requesting CPU is below the neighborhood mean load, requesting one or more neighboring CPUs to transfer tasks to the requesting CPU;
    determining a total number of tasks which are to be requested from a neighboring CPU so that, after the transfer, the load on the requested neighboring CPU is not below the neighborhood mean load;
    for each neighboring CPU from the one or more neighboring CPUs, determining if a condition is satisfied to send one or more tasks from the neighboring CPU to the requesting CPU; and
    if the condition is satisfied, sending the one or more tasks from the neighboring CPU to the requesting CPU, thereby balancing load between CPUs in the neighborhood.

2. The method of claim 1, wherein the size of the neighborhood is defined in terms of number of hops separating CPUs.

3. The method of claim 1, wherein conditionally requesting load information from the neighboring CPUs involves:
    determining whether the load of the requesting CPU is below a threshold; and
    if so, requesting load information from the neighboring CPUs.

4. The method of claim 3, wherein the threshold is determined based on a delay involved in requesting and receiving load information from a neighboring CPU and a delay involved in requesting and receiving tasks from a neighboring CPU.

5. The method of claim 1, wherein determining the total number of tasks which are to be requested from the neighboring CPUs involves selecting the larger of:
- the amount by which the neighborhood mean load is larger than the load on the requesting CPU, and
- a minimum number of tasks which can be transferred between CPUs.

6. The method of claim 1, wherein determining the number of tasks which are to be requested from a neighboring CPU involves:
- ranking the neighboring CPUs in decreasing order with respect to their load; and
- determining the number of tasks which are to be requested from each neighboring CPU, starting from the highest-loaded CPU, until the total number of tasks which are to be requested from the neighboring CPUs is satisfied.

7. A method for balancing load between task queues in a multiprocessor system, the method comprising:
- receiving at a first CPU a request to transfer a number of tasks to a second CPU, wherein the request includes the number of tasks;
- determining whether a load on the first CPU if the number of tasks are transferred is higher than or equal to a load on the second CPU if the number of tasks are transferred, and, if so, transferring the number of tasks to the second CPU;
- determining whether a load on the first CPU if the number of tasks are transferred is higher than or equal to a load on the second CPU if the number of tasks are transferred, and, if so, transferring the number of tasks to the second CPU;
- otherwise, if the load on the first CPU if the number of tasks are transferred is lower than the load on the second CPU if the number of tasks are transferred:
  - determining a reduced number of tasks to transfer so that the load on the first CPU if the reduced number of tasks are transferred is higher than or equal to the load on the second CPU if the reduced number of tasks are transferred; and
  - if the reduced number of tasks is greater than or equal to a minimum number of tasks which can be transferred between CPUs, transferring the reduced number of tasks to the second CPU.

8. A computer-readable storage medium storing instructions that when executed by a computer cause the computer to perform a method for balancing load between task queues in a multiprocessor system, the method comprising:
- conditionally requesting load information from a number of neighboring CPUs in a neighborhood of a requesting CPU;
- in response to the request, receiving load information from one or more neighboring CPUs;
- calculating a neighborhood mean load based on the received load information;
- if a load on the requesting CPU is below the neighborhood mean load, requesting one or more neighboring CPUs to transfer tasks to the requesting CPU;
- determining a total number of tasks which are to be requested from a neighboring CPU so that, after the transfer, the load on the requested neighboring CPU is not below the neighborhood mean load;
- for each neighboring CPU from the one or more neighboring CPUs, determining if a condition is satisfied to send one or more tasks from the neighboring CPU to the requesting CPU; and
- if the condition is satisfied, sending the one or more tasks from the neighboring CPU to the requesting CPU, thereby balancing load between CPUs in the neighborhood.

9. The computer-readable storage medium of claim 8, wherein the size of the neighborhood is defined in terms of number of hops separating CPUs.

10. The computer-readable storage medium of claim 8, wherein conditionally requesting load information from the neighboring CPUs involves:
- determining whether the load of the requesting CPU is below a threshold; and
- if so, requesting load information from the neighboring CPUs.

11. The computer-readable storage medium of claim 10, wherein the threshold is determined based on a delay involved in requesting and receiving load information from a neighboring CPU and a delay involved in requesting and receiving tasks from a neighboring CPU.

12. The computer-readable storage medium of claim 8, wherein determining the total number of tasks which are to be requested from the neighboring CPUs involves selecting the larger of:
- the amount by which the neighborhood mean load is larger than the load on the requesting CPU, and
- a minimum number of tasks which can be transferred between CPUs.

13. The computer-readable storage medium of claim 8, wherein determining the number of tasks which are to be requested from a neighboring CPU involves:
- ranking the neighboring CPUs in decreasing order with respect to their load; and
- determining the number of tasks which are to be requested from each neighboring CPU, starting from the highest-loaded CPU, until the total number of tasks which are to be requested from the neighboring CPUs is satisfied.

14. A computer-readable storage medium storing instructions that when executed by a computer cause the computer to perform a method for balancing load between task queues in a multiprocessor system, the method comprising:
- receiving at a first CPU a request to transfer a number of tasks to a second CPU, wherein the request includes the number of tasks;
- determining whether a load on the first CPU if the number of tasks are transferred is higher than or equal to a load on the second CPU if the number of tasks are transferred, and, if so, transferring the number of tasks to the second CPU;
- otherwise, if the load on the first CPU if the number of tasks are transferred is lower than the load on the second CPU if the number of tasks are transferred:
  - determining a reduced number of tasks to transfer so that the load on the first CPU if the reduced number of tasks are transferred is higher than or equal to the load on the second CPU if the reduced number of tasks are transferred; and
  - if the reduced number of tasks is greater than or equal to a minimum number of tasks which can be transferred between CPUs, transferring the reduced number of tasks to the second CPU.

* * * * *

UNITED STATES PATENT AND TRADEMARK OFFICE
CERTIFICATE OF CORRECTION

| | | |
|---|---|---|
| PATENT NO. | : 7,665,092 B1 | Page 1 of 1 |
| APPLICATION NO. | : 11/013498 | |
| DATED | : February 16, 2010 | |
| INVENTOR(S) | : David Vengerov | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1462 days.

Signed and Sealed this

Seventh Day of December, 2010

David J. Kappos
*Director of the United States Patent and Trademark Office*